United States Patent [19]

Scott

[11] Patent Number: 5,035,060
[45] Date of Patent: Jul. 30, 1991

[54] METHOD OF MAPPING UNDERGROUND MINES

[75] Inventor: Douglas F. Scott, Spokane, Wash.

[73] Assignee: The United States of America as represented by the Secretary of the Interior, Washington, D.C.

[21] Appl. No.: 548,337

[22] Filed: Jul. 5, 1990

[51] Int. Cl.⁵ .............................................. G01C 15/02
[52] U.S. Cl. ........................................ 33/228; 33/1 E; 33/1 H; 33/227; 33/275 R; 33/DIG. 21
[58] Field of Search ................ 33/227, 228, DIG. 21, 33/1 E, 1 CC, 275 R, 285, 290, 291, 293, 1 H, 274

[56] References Cited

U.S. PATENT DOCUMENTS

| | | | |
|---|---|---|---|
| 975,213 | 11/1910 | Cronwell | 33/227 |
| 1,081,829 | 12/1913 | Higgins | 33/275 R |
| 1,792,639 | 2/1931 | Herrick | 33/1 E |
| 2,186,677 | 1/1940 | Humphreys | 33/1 E |
| 2,496,422 | 2/1950 | Subkow | 33/1 E |
| 3,897,637 | 8/1975 | Genho | 33/227 |
| 4,333,242 | 6/1982 | Genho, Sr. | 33/227 |
| 4,580,345 | 4/1986 | Andrew | 33/228 |

FOREIGN PATENT DOCUMENTS 736966  9/1955  United Kingdom ................ 33/1 H

OTHER PUBLICATIONS

"Laser Instruments for Engineering Construction", Date: 9-67.

Primary Examiner—William A. Cuchlinski, Jr.
Assistant Examiner—C. W. Fulton
Attorney, Agent, or Firm—E. Philip Koltos

[57] ABSTRACT

A method wherein a light emitting device, such as a laser, is used to precisely measure strike measurements of planar geologic features; for example, bedding planes, fractures, or fold axes. A pre-existing survey line between two spads is first located on a plan view map of the mine. A tape measure is placed between the two located spads in the mine. A laser is then placed on the planar surface to be measured, and the instrument leveled. The laser unit in the instrument is activated and the beam located at its intersection with the tape measure. The location point of the laser unit on the wall of the mine is marked on a mine map, the point on the tape where the beam intersects the tape is marked on a mine map, and a line is drawn between the two points. This line defines the strike of the planar feature relative to the survey line.

7 Claims, 1 Drawing Sheet

METHOD OF MAPPING UNDERGROUND MINES

TECHNICAL FIELD

This invention relates to a method of mapping detailed geology in underground mines, and more particularly to a method of mapping underground mines using a laser.

BACKGROUND ART The most commonly used instrument for determining the strike of a planar geologic feature is a Brunton Compass. The major disadvantage of this compass, or any compass, is that metal affects the magnetic needle, distorting the actual strike of the planar surface. A compass cannot be used in an underground mine because of the massive amounts of iron and metal used in pipes, bolts, and equipment. The alternate method for measuring strike underground is with a transit or theodolite. The major disadvantages of this method are time and precision. The time needed to resurvey the previously surveyed spads is labor intensive, and is redundant. Also, errors can develop from acute angles near the instrument.

Those concerned with these and other problems recognize the need for a quick, inexpensive, and precise method for measuring the strike of planar geologic features in an underground mine.

DISCLOSURE OF THE INVENTION

The present invention provides a method wherein a light emitting device, such as a laser, is used to precisely measure strike measurements of planar geologic features; for example, bedding planes, fractures, or fold axes. A pre-existing survey line between two spads is first located on a plan view map of the mine. A tape measure is placed between the two located spads in the mine. A laser is then placed on the planar surface to be measured, and the instrument leveled. The laser unit in the instrument is activated and the beam located at its intersection with the tape measure. The location point of the laser unit on the wall of the mine is marked on a mine map, the point on the tape where the beam intersects the tape is marked on a mine map, and a line is drawn between the two points. This line defines the strike of the planar feature relative to the survey line.

An object of the present invention is the provision of an improved method of mapping detailed geology in underground mines.

Another object is to provide a method of mapping underground mines that is quick, inexpensive, and precise.

A further object of the invention is the provision of a method of mapping underground mines that produces exact strike measurements based on spad locations on a pre-existing mine plan view map.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
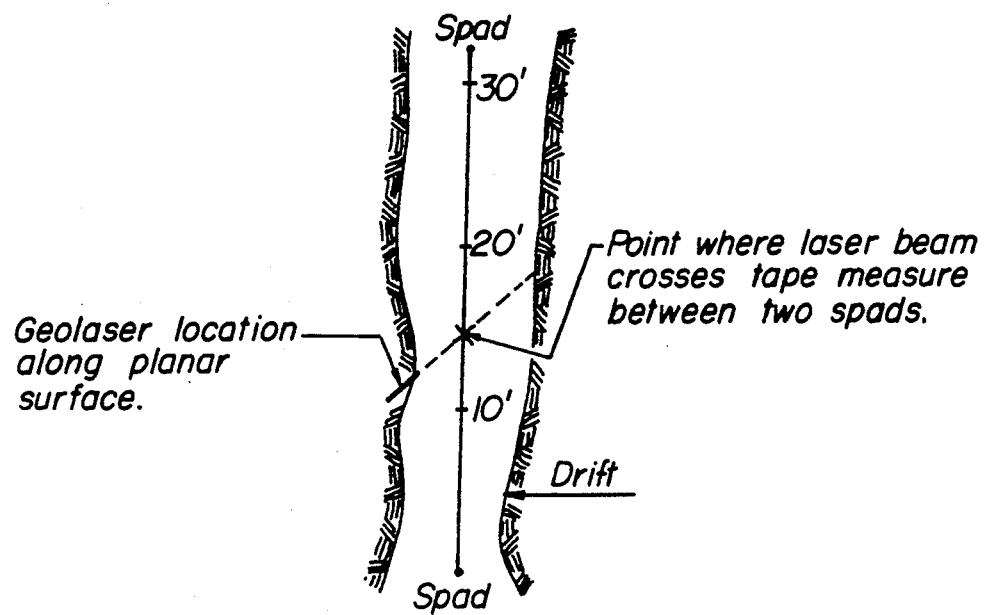
FIG. 1 is a portion of a plan view map of an underground mine illustrating the method of the present invention.

Referring now to the drawings, wherein like reference numerals designate identical or corresponding parts throughout the several views, FIG. 1 illustrates the mapping method using the laser unit (10).

Figure 3:
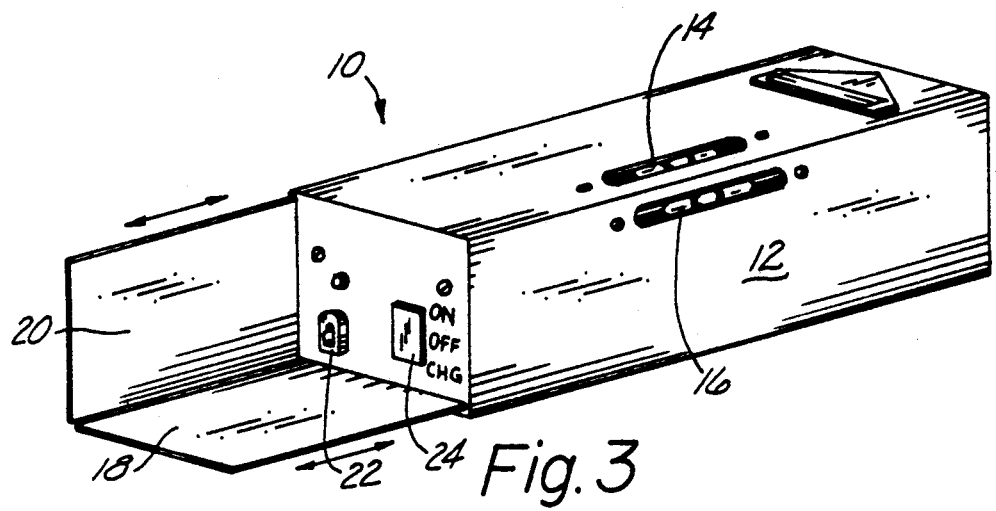
FIG. 3 is a perspective view of a laser having a housing that carries a pair of level vials and a pair of extendable metal strips.

As shown in FIG. 3, the laser unit (10) is enclosed in a housing (12) that carries a pair of level vials (14 and 16) mounted at 90° to one another. Also, the housing (12) supports a pair of selectively extendable sliding metal rails (18 and 20) on one side and the bottom of the housing (12). The rails (18 and 20) slide and can be inserted into thin cracks in the mine wall or in the wire mesh covering the mine walls as is used in many underground mines. A rechargeable battery (not shown) is disposed within the housing (12) so that the unit can be used without the need of a cumbersome battery pack. A recharge jack (22) and switch (24) including a recharge position are carried on the rear of the housing (12).

Figure 2:
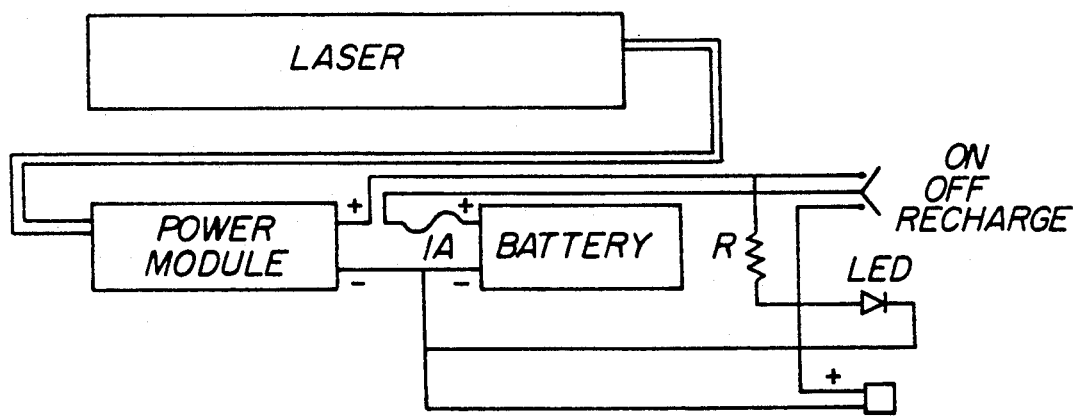
FIG. 2 is a schematic diagram showing a laser unit used in the method of the present invention.

The laser unit (10) used in the mapping method could be of various designs, including that shown in the schematic diagram of FIG. 2. The following electronic specifications are representative of a suitable laser unit:

Uniphase Helium-Neon Laser Head

Minimum Output Power: 0.5 mW (TEM$_{00}$, 663 nm)
Operating Voltage: 1350±100 VDC
Operating Current: 4.0±0.1 ma
Maximum Starting Voltage: 7 KVDC
Expected Operating Lifetime: 12,000 hrs
Weight: 7 oz.
CDRH Class: II Uniphase Laser Power Module Input Voltage: 12 VDC
Output Voltage: 1250 VDC
Output Current: 4.0 ma Battery Pak 10 NlCd AA 1.2 Batteries connected in series for a total of 12 VDC,
0.5 AH (arranged in two rows of five batteries)

Electronic Components

Archer Subminiature Red LED Indicator Lamp, Model 276-028A, 2.1 V @20 ma
¼ w, 1000±10% Ohm Resistor
Switchcraft Mini-Rocker Switch, Model 104B2NN, on-off-on, 12 VDC, 5 A
Recharge Jack, 12 VDC compatible with available battery charger
Battery Charger, Input 120 VAC 60 Hz 5 W, Output 12-18 VDC @ 50 ma
Amp Fuse with In-Line Fuse Holder Operation of the laser (10) in the mapping method of the present invention is based on the fact that any level beam of light on a planar feature will define the line of strike of that plane. First, a plan view map of the mine is required. All survey spads are normally shown on the map. Second, a tape measure is stretched from spad to spad, underground. The laser (10) is then placed on any planar geologic feature to be mapped, and the level vials (14 and 16) contained in the unit are utilized to direct the beam in a horizontal line. If the unit cannot be placed along a tight fracture, then the metal rails (18 and 20) along the side and bottom of the unit can be extended to fit into a tight crack. The laser beam is activated and the beam is traced to its intersection with the tape measure. A four to six foot rod is then used to mark the intersection of the beam with the tape measure. The location of the laser on the wall of the mine is marked on the plan view map as is the point where the beam crossed the tape measure. A line is then drawn between the two points defining the line of strike relative to the survey line and the mine map.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A method of measuring the strike of planar geologic features in an underground mine, comprising the steps of:

locating two survey spads on a plan view map of a mine;

attaching a measuring device to extend between said two survey spads in the mine;

placing a light emitting device on a planar geologic feature on a wall in the mine;

leveling the light emitting device;

activating the light emitting device to emit a light beam in a horizontal line intersecting the measuring device;

marking in the mine the location of the intersection of the light beam and the measuring device;

marking on the plan view map the position of the light emitting device on the wall and the point where the light beam intersects the measuring device; and drawing a straight line on the plan view map between the position of the light emitting device and the point of intersection, wherein the straight line defines the line of strike relative to the survey line and the mine map.

2. The method of claim 1 wherein the measuring device is a flexible tape measure.

3. The method of claim 1 wherein the light emitting device is a laser.

4. The method of claim 3 wherein the laser includes a housing having selectively extendable metal strips disposed to selectively engage said planar geologic feature and support the laser.

5. The method of claim 3 wherein the laser includes a housing that carries a pair of level vials mounted on the housing on surfaces disposed at 90° to one another.

6. The method of claim 4 wherein the housing carries a pair of level vials mounted on the housing on surfaces disposed at 90° to one another.

7. The method of claim 5 wherein a pair of selectively extendable metal strips are disposed on surfaces disposed at 180° to the surfaces carrying the level vials.

* * * * *